United States Patent
Park et al.

(10) Patent No.: US 8,811,277 B2
(45) Date of Patent: Aug. 19, 2014

(54) METHOD OF LOW DUTY MODE OPERATION FOR FEMTO BASE STATION

(75) Inventors: Gi Won Park, Anyang-si (KR); Ki Seon Ryu, Sungnam-si (KR); Jin Sam Kwak, Gunpo-si (KR); Yong Ho Kim, Incheon-si (KR); Young Soo Yuk, Seoul (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 12/796,491

(22) Filed: Jun. 8, 2010

(65) Prior Publication Data

US 2010/0309849 A1 Dec. 9, 2010

Related U.S. Application Data

(60) Provisional application No. 61/185,197, filed on Jun. 9, 2009.

(30) Foreign Application Priority Data

Dec. 31, 2009 (KR) .......................... 10-2009-0135444

(51) Int. Cl.
*H04Q 11/00* (2006.01)
*H04W 52/02* (2009.01)
*H04W 84/04* (2009.01)
*H04W 28/04* (2009.01)

(52) U.S. Cl.
CPC ........ *H04W 52/0206* (2013.01); *H04W 84/045* (2013.01); *H04W 28/04* (2013.01)
USPC .......................................... 370/328; 370/476

(58) Field of Classification Search
None
See application file for complete search history.

(56) References Cited

U.S. PATENT DOCUMENTS

| 7,317,732 | B2 | 1/2008 | Mills et al. |
| 8,442,539 | B2 * | 5/2013 | Li et al. .......................... 455/444 |
| 2004/0087306 | A1 | 5/2004 | Moulsley et al. |
| 2007/0183391 | A1 | 8/2007 | Akita et al. |
| 2008/0008510 | A1 | 1/2008 | Lee et al. |
| 2010/0165942 | A1 * | 7/2010 | Liao et al. ...................... 370/329 |
| 2010/0304743 | A1 * | 12/2010 | Jung et al. ...................... 455/434 |
| 2012/0015645 | A1 * | 1/2012 | Moon et al. ................. 455/422.1 |
| 2012/0063403 | A1 * | 3/2012 | Moon et al. .................... 370/329 |

FOREIGN PATENT DOCUMENTS

| CN | 1711719 A | 12/2005 |
| CN | 101282335 A | 10/2008 |
| KR | 10-2009-0045183 A | 5/2009 |
| WO | WO 2007/031958 A2 | 3/2007 |

OTHER PUBLICATIONS

Giwon Park, et al., 802.16m-Available Interval of LDM in Femto ABS, IEEE C802.16m-09/1976, Aug. 29, 2009, pp. 1-4.

(Continued)

*Primary Examiner* — Kevin C Harper
*Assistant Examiner* — Samina Choudhry
(74) *Attorney, Agent, or Firm* — Birch, Stewart, Kolasch & Birch, LLP

(57) ABSTRACT

A method of an efficient low duty mode (LDM) operation for a femto base station is disclosed. The method of a low duty mode (LDM) operation for a femto base station comprises operating at an available interval of a first length according to a default LDM pattern; and operating at an unavailable interval of a second length according to the default LDM pattern, wherein the available interval begins with a frame including a first preamble, the first preamble including information of carrier configuration and system bandwidth.

22 Claims, 6 Drawing Sheets

(56) References Cited

OTHER PUBLICATIONS

Sungho Moon, et al., "Proposed Text Based on ToC Released by SCH DG Chair", IEEE C802.16m-9/0940, Apr. 27, 2009, pp. 1-3.

Yi Husan, et al., Proposal to Remove Constraint on Using Physical 5 MHz Bandwidth for SFH, IEEE C80216m-9/0826, Apr. 24, 2009, pp. 1-6.

Ying Li, et al., IEEE 802.16m on Low Duty Cycle Mode of Femtocell Base Stations, IEEE C80216m-09_0821rl, May 4, 2009, pp. 1-6.

* cited by examiner

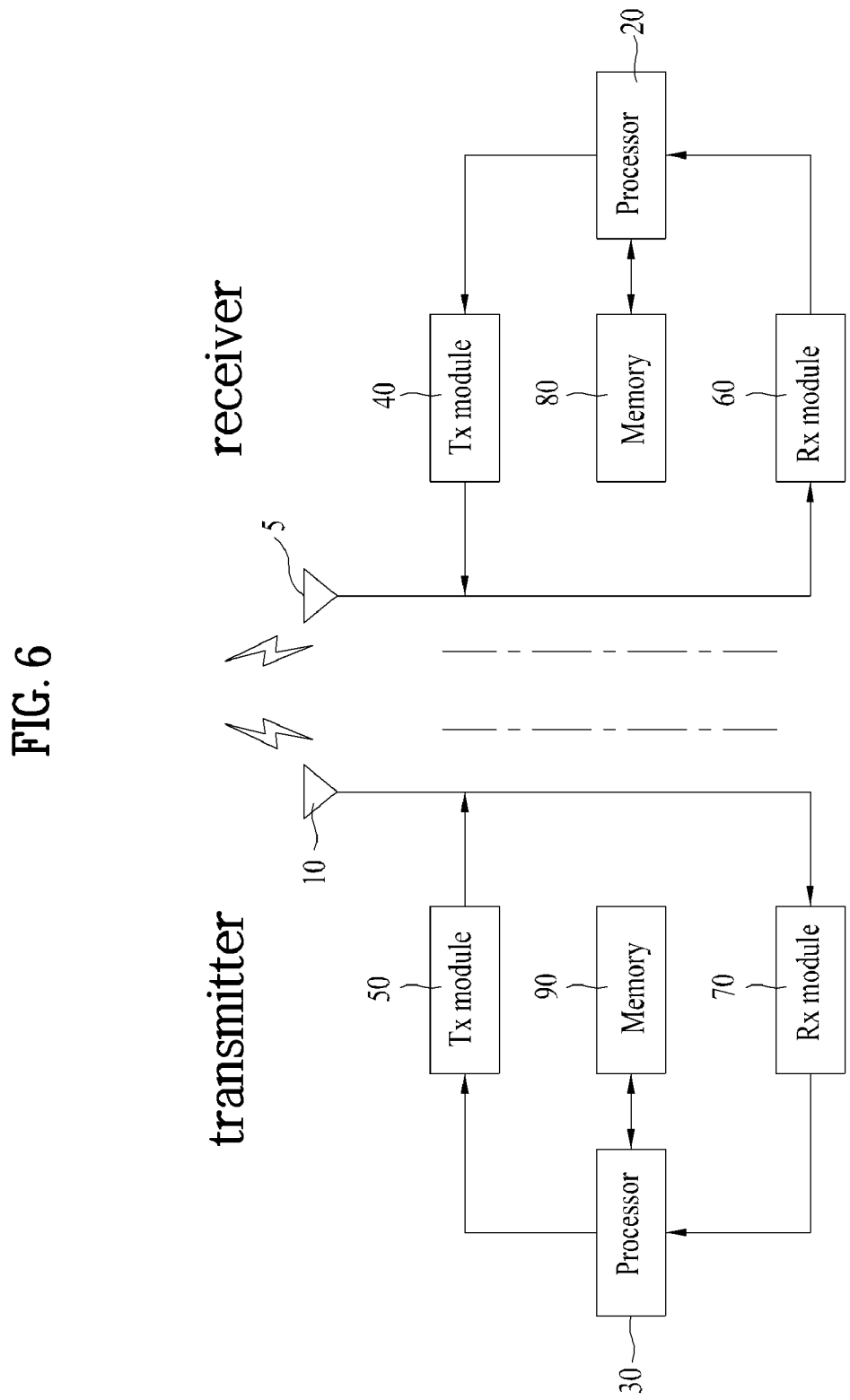

METHOD OF LOW DUTY MODE OPERATION FOR FEMTO BASE STATION

This application also claims the benefit of U.S. Provisional Application Ser. No. 61/185,197, filed on Jun. 9, 2009, the contents of which are hereby incorporated by reference in their entirety.

This application claims the benefit of the Korean Patent Application No. 10-2009-0135444, filed on Dec. 31, 2009, which is hereby incorporated by reference as if fully set forth herein.

BACKGROUND OF THE INVENTION

1. Field of the Invention

The present invention relates to a wireless access system, and more particularly, to a method of an efficient low duty mode operation for a femto base station.

2. Discussion of the Related Art

A femtocell will be described in brief.

Femto is a prefix in the metric system, denoting a factor of $10^{-15}$. Hence a femtocell or FBS refers to an ultra-small indoor Access Point (AP) for low-power home use or office use. Although the term "femtocell" is sometimes interchangeably used with "picocell", the former is used in the sense of a more advanced cell. The FBS is a small cellular BS connected to a broadband router and functions to connect $2^{nd}$ Generation (2G) and $3^{rd}$ Generation (3G) voice and data to a backbone network of a mobile communication service provider via the Digital Subscriber Line (DSL).

An investigation report was released, saying that FBSs would accelerate 3G proliferation and could be a driving force behind expansion of indoor coverage. It is forecast that by 2011, there will be 102 million users of users of femtocell products and 32 million APs worldwide. According to chief analyst of ABI Research, Stuart Carlaw, "From a technological standpoint, their better in-building coverage for technologies such as WCDMA, HSDPA and EVDO is an incredibly important aspect of service delivery. From a strategic and financial standpoint, the routing of traffic through the IP network significantly enhances network quality and capacity, and reduces the OPEX that carriers expend on backhaul."

Femtocells can expand cell coverage and increase the quality of voice service. Mobile communication service providers are expecting that subscribers may be familiar with 3G by providing data service via femtocells. The femtocells are also called FBSs or femto Base Transceiver Stations (BTSs).

In summary, femtocells offer the following benefits.

1. Cell coverage improvement
2. Infrastructure cost decrease
3. New service offering
4. Fixed Mobile Convergence (FMC) acceleration.

One or more femtocells may be grouped on a service basis or geological area basis. For example, a femtocell group that allows access to a restricted group of Mobile Stations (MSs) is called a Closed Subscriber Group (CSG). An FBS allows access only to an MS that has subscribed to the CSG by checking the CSG Identifier (ID) of the MS.

FIG. 1 illustrates an exemplary network configuration including FBSs.

FBSs are new network entities added to a legacy network. Accordingly, the use of FBSs may bring about additions or modifications to an entire network structure. An FBS may directly access the Internet and function as a BS. Therefore, the FBS can perform almost all functions of a macro BS. In addition, the FBS may relay data from the macro BS to MSs.

In FIG. 1, the network is configured by adding a Femto Network Gateway (FNG) to the legacy network. The FNG may communicate with an Access Service Network (ASN) gateway and a Connectivity Service Network (CSN). The FNG may use an Rx interface for communicating with the ASN and an Ry interface for communicating with the CSN.

An FBS may access directly a Transmission Control Protocol/Internet Protocol (TCP/IP) Internet and receive a service from the CSN via the FNG. An MS connected to the FBS may receive services from the FNG or CSN in relation to IP Multimedia Subsystem (IMS) authentication, etc.

The FBS is connected to an AP via an R1 interface. This means that the FBS may receive a downlink channel from a macro BS. The FBS may also transmit a control signal to the macro BS.

In order to save the power and avoid interference with a neighboring base station, the femto base station may enter a low duty mode. At this time, a method for synchronizing a femto base station operated at a low duty mode with a mobile station and efficiently receiving a superframe header will be required.

SUMMARY OF THE INVENTION

Accordingly, the present invention is directed to a method of a low duty mode operation for a femto base station, which substantially obviates one or more problems due to limitations and disadvantages of the related art.

An object of the present invention is to provide a method of an efficient low duty mode operation for a femto cell in a wireless access system that supports a femto cell.

Another object of the present invention is to provide a method for setting a pattern of a low duty mode to minimize the time required for decoding of a superframe header and synchronization acquisition of a mobile station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of a low duty mode (LDM) operation for a femto base station comprises operating at an available interval of a first length according to a default LDM pattern; and operating at an unavailable interval of a second length according to the default LDM pattern, wherein the available interval starts from a frame that includes a first preamble, the first preamble including information of carrier configuration and system bandwidth.

At this time, the femto base station enters the low duty mode if all mobile stations attached to the femto base station are operated in an idle mode or a sleep mode, or if there is no mobile station in a service range of the femto base station.

Also, the method further comprises synchronizing with an overlay macro base station, wherein the first preamble and the second preamble are transmitted at the same time when the preambles are transmitted from the overlay macro base station.

Also, the first length and the second length are respectively set in a unit of four frames.

Also, one unit of the available interval includes one first preamble, three second preambles, and one superframe header.

Also, the first preamble is a PA preamble (primary advanced-preamble), and the second preamble is a secondary advanced-preamble that includes cell ID and base station type information.

Also, information of the LDM pattern is pre-provisioned between the femto base station and a mobile station, or is transmitted to the mobile station through a predetermined broadcast message or a registration response (AAI_REG-RSP) message.

The information of the default low duty mode pattern includes the first length, the second length, and a superframe number where the low duty mode operation starts.

In another aspect of the present invention, a method of scanning a femto base station operated at a low duty mode (LDM) through a mobile station comprises receiving a first preamble, which includes information of carrier configuration and system bandwidth, from an available interval of a first length according to a default LDM pattern; and receiving a second preamble, which includes cell ID and base station type information, from the available interval; and receiving a superframe header from the available interval, wherein the available interval starts from a frame that includes the first preamble.

At this time, the available interval has a length set in a unit of four frames.

One unit of the available interval includes one first preamble, three second preambles, and one superframe header.

Also, the first preamble is a PA preamble (primary advanced-preamble), and the second preamble is a secondary advanced-preamble.

Also, information of the LDM pattern is pre-provisioned between the femto base station and the mobile station, or is transmitted to the mobile station through a predetermined broadcast message or a registration response (AAI_REG-RSP) message.

In other aspect of the present invention, a mobile station comprises a processor; and a radio frequency (RF) module transmitting and receiving a radio signal to and from the outside under the control of the processor, wherein the processor controls the RF module and scans the femto base station by receiving a first preamble, which includes information of carrier configuration and system bandwidth, a second preamble, which includes cell ID and base station type information, and a superframe header from an available interval according to a default LDM pattern of a femto base station operated at a low duty mode, and the available interval starts from a frame that includes the first preamble.

At this time, the available interval has a length set in a unit of four frames.

Also, one unit of the available interval includes one first preamble, three second preambles, and one superframe header.

Also, the first preamble is a PA preamble (primary advanced-preamble), and the second preamble is a secondary advanced-preamble.

Moreover, information of the LDM pattern is pre-provisioned between the femto base station and the mobile station, or is transmitted to the mobile station through a predetermined broadcast message or a registration response (AAI_REG-RSP) message.

According to the embodiments of the present invention, the following advantages can be obtained.

First, according to the embodiments of the present invention, it is possible to minimize power consumption of the femto base station and interference with a macro cell in the wireless access system that supports a femto cell.

Second, as the low duty mode according to the embodiments of the present invention is used, the mobile station can receive preambles in the femto cell in due order within the minimum time range and decode a superframe header.

Even though the femto base station is operated at a power saving mode, the mobile station within the femto cell can perform reliable communication.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a block diagram illustrating an example of a transmitter and a receiver according to another embodiment of the present invention.

DETAILED DESCRIPTION OF THE INVENTION

Figure 1:
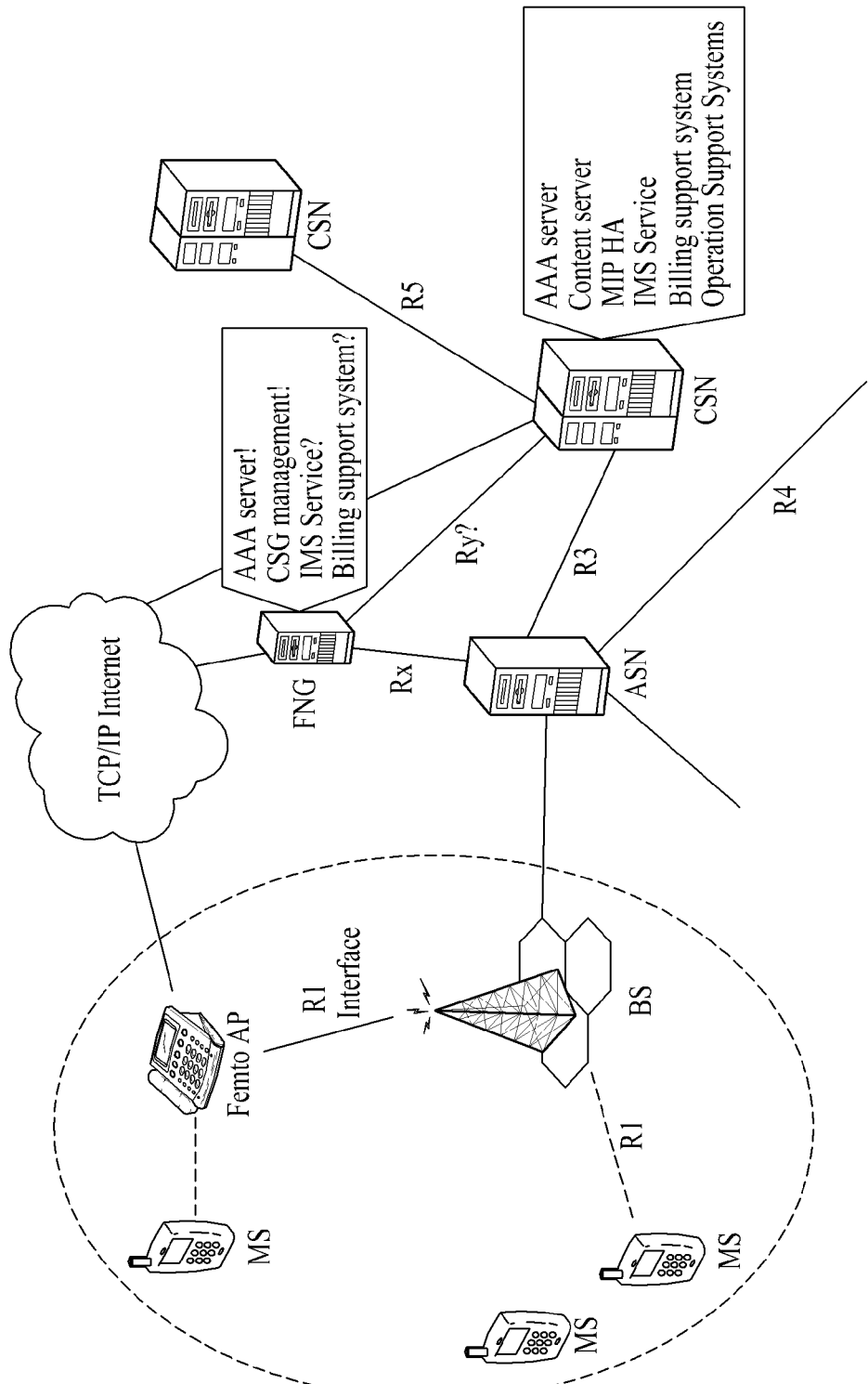
FIG. 1 is a diagram illustrating an example of a network structure including a femto base station (FBS)

Reference will now be made in detail to the preferred embodiments of the present invention, examples of which are illustrated in the accompanying drawings. Wherever possible, the same reference numbers will be used throughout the drawings to refer to the same or like parts.

The present invention relates to a wireless access system. Hereinafter, methods of efficient low duty mode operation of a femto base station according to the embodiments of the present invention will be described.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of the drawings, procedures or steps that may make the subject matter of the present invention obscure will be omitted, and procedures or steps that can be understood by the person with ordinary skill in the art will be omitted.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), Advanced Base Station (ABS) and access point. Also, the mobile station may be replaced with terms such as a user equipment (UE), a subscriber station (SS), a mobile subscriber station (MSS), Advanced Mobile Station (AMS) and a mobile terminal (MT).

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

Meanwhile, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2 and P802.16m.

Specific terminologies hereinafter used in the embodiments of the present invention are provided to assist understanding of the present invention, and various modifications can be made in the specific terminologies within the range that they do not depart from technical spirits of the present invention.

Hereinafter, a low duty mode of a femto base station according to the present invention will be described.

The femto base station according to the present invention can exist within a network, a coverage area of at least one macro base station (MBS), a macro cell or an area corresponding to at least one paging group.

The femto base station according to the present invention may enter a low duty mode to save the power and reduce interference with a neighboring cell.

A low-duty operation includes an available interval (AI) and an unavailable interval (UAI). At each interval, the femto base station may operate as follows.

First of all, at the available interval, the femto base station can activate a radio interface for data traffic transmission, ranging, system information transmission, or paging. Namely, the femto base station can transmit a synchronization channel and/or a superframe header (SFH) to mobile stations through a downlink for the available interval. Also, the femto base station can monitor access attempt transmitted by the mobile station for an uplink interval, for example, whether ranging code transmission exists.

Next, the unavailable interval will be described. The femto base station does not perform transmission on the radio interfaced for the unavailable interval. In this case, the femto base station can reduce interference with a neighboring femto base station or a macro base station, which uses the same frequency bandwidth as that of the femto base station, and at the same time can reduce power consumption. Also, the femto base station may not perform synchronization with an overlay macro base station, which includes itself, or measure interference from a neighboring cell.

For convenience, one available interval and one unavailable interval will be referred to as a low duty cycle in the present invention.

Hereinafter, a condition for entering the aforementioned low duty mode at a femto base station will be described.

The condition for entering the low duty mode at a femto base station can be determined depending on the presence of a mobile station attached to the femto base station or mobile station in the process of network entry. Namely, if all mobile stations attached to the femto base station operate at an idle mode or a sleep mode, or if no mobile station exists within coverage of the femto base station, the femto base station may enter the low duty mode.

At this time, a sequence of the available interval and the unavailable interval can form a low duty mode pattern (hereinafter, referred to as 'LDM pattern').

At this time, the iteration of one available interval and one unavailable interval could be a default LDM pattern. If the femto base station enters the low duty mode, the default LDM pattern of the corresponding femto base station can be applied. The femto base station may have one or more default LDM patterns.

The default LDM pattern may include parameters as follows.

Available interval (AI): is a value indicating a length of the available interval, and the available interval is preferably set in a unit of four frames.

Unavailable interval (UAI): is a value indicating a length of the unavailable interval, and the unavailable interval is also preferably set in a unit of four frames.

Start superframe number: indicates a superframe number where the low duty mode starts.

The default LDM Pattern may be pre-provisioned in a predetermined area by a communication provider or another entity, or may be unicast to the mobile station through either a broadcast message of the macro base station or the femto base station or a registration response (AAI_REG-RSP) message if the mobile station performs initial access to the femto base station.

It is assumed that the mobile station intends to perform initial access to the femto base station operated at the low duty mode according to the present invention or handover from the overlay macro base station or another neighboring femto base station. At this time, when the femto base station is operated in accordance with a predetermined default LDM pattern, as described above, the mobile station should perform synchronization with the femto base station and receive a superframe header within the available interval not the unavailable interval of the corresponding default LDM Pattern.

In this case, the femto base station can scan a downlink channel of the overlay macro base station or synchronize with the macro base station through a backbone network. As a result, a PA preamble and a SA preamble are transmitted at the same time when the preambles are transmitted from the overlay macro base station.

The PA preamble means a primary advanced preamble and includes information of carrier configuration and system bandwidth. Also, the SA preamble means a secondary advanced preamble and includes cell ID and information of base station type. The base station type includes information of the macro base station or the femto base station.

In order to receive the superframe header of the femto base station, the mobile station should receive the PA preamble and the SA preamble and synchronize with the corresponding femto base station. At this time, a problem may occur. The problem will be described with reference to FIG. 2.

Figure 2:
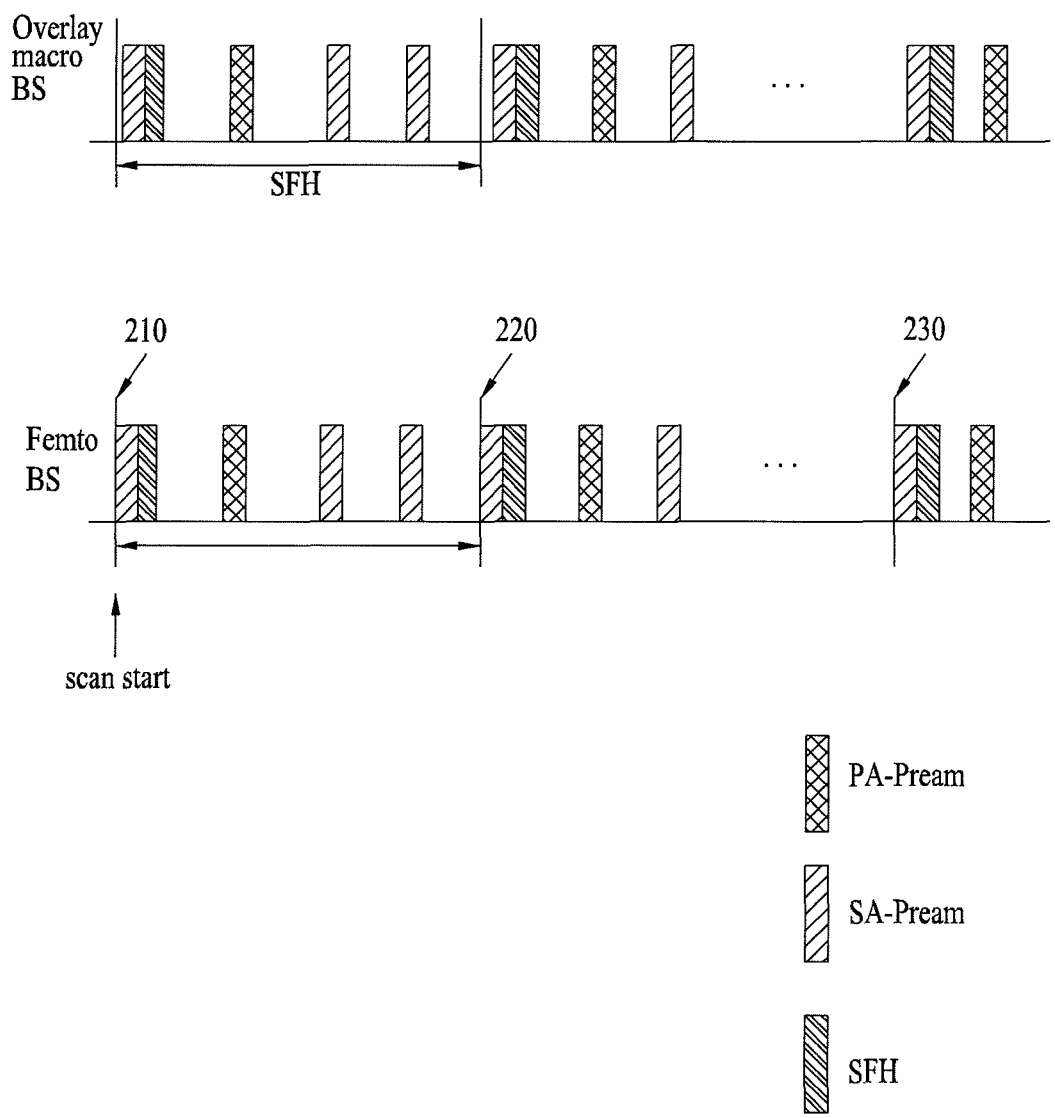
FIG. 2 is a diagram illustrating an example of a low duty mode pattern of a femto base station.

FIG. 2 is a diagram illustrating an example of a low duty mode pattern of a general femto base station.

Referring to FIG. 2, it is assumed that a superframe of the overlay macro base station includes four frames, wherein preambles are transmitted to the start of each frame in the order of SA preamble→superframe header→PA preamble→SA preamble→SA preamble. In this case, the femto base station has the same preamble transmission order as that of the overlay macro base station in a state that it is synchronized with the overlay macro base station (at this time, it is assumed that the transmission position of the superframe header from the femto base station is the same as that from the macro base station.) Also, it is assumed that the femto base station enters the low duty mode at time 210 and is operated in accordance with a default LDM pattern. At this time, it is assumed that the available interval (AI) starts at the same time (210) when the superframe starts in accordance with the default LDM pattern of the femto base station, the length of the available interval is set to four frames, and the length of the unavailable interval (UAI) is set to 4N frames (N is a natural number greater than or equal to 1). In this case, the length of the available interval may be set to 4N like the unavailable interval.

Under the circumstances, when the mobile station attempts scan for receiving the superframe header (SFH) of the femto base station from a timing point 210 corresponding to a start point of the available interval, as described above, it should follow the order of PA preamble, SA preamble→superframe header in order to be able to receive the superframe header. However, a problem arises if the mobile station first receives the PA preamble at the second frame and also receives the SA preamble at the third or fourth frame but does not receive the next superframe header because the available interval ends at timing point 220. The mobile station must then wait for the timing point 230 when next available interval starts. That is, in this scenario, the mobile station cannot receive the superframe header until the first frame of the second available interval (timing point 230). As a result, a problem occurs in that unnecessary delay occurs for the time corresponding to at least one unavailable interval.

In order to solve such a problem, one embodiment of the present invention suggests that the available interval of the default LDM pattern starts from the frame including the PA preamble.

In other words, regardless of the superframe unit of the macro base station and/or the femto base station, if the available interval of the default LDM pattern starts from the frame including the PA preamble, the mobile station can receive the superframe header after receiving the PA preamble and the SA preamble within one available interval even if the available interval is set to the shortest possible length, which corresponds to four frames.

Hereinafter, a detailed example of a method for setting a default LDM pattern in accordance with one embodiment of the present invention will be described with reference to FIG. 3 to FIG. 5.

Figure 3:
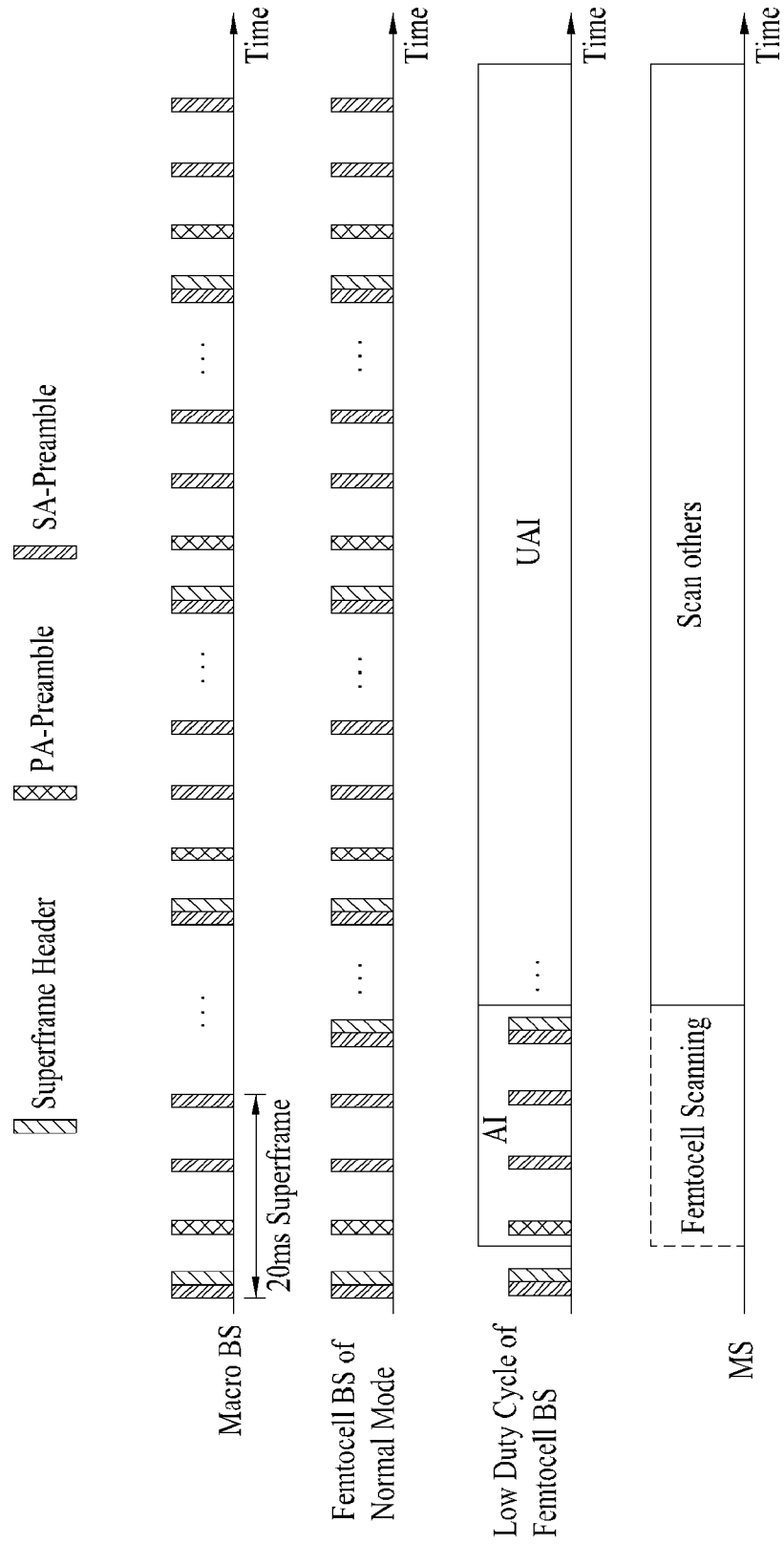
FIG. 3 is a diagram illustrating an example of a method for setting a default LDM pattern in accordance with one embodiment of the present invention.

FIG. 3 is a diagram illustrating an example of a method for setting a default LDM pattern in accordance with one embodiment of the present invention.

In FIG. 3, it is assumed that the available interval of the default LDM pattern includes four frames in the order of PA preamble→SA preamble→SA preamble→SA preamble→superframe header. Also, it is assumed that the macro base station and each femto base station have the same frame structure.

Referring to FIG. 3, the mobile station can receive the PA preamble, the SA preamble and the superframe header in due order at the start point of the available interval of the default LDM pattern of the corresponding femto base station to attempt scan for the femto base station operated at the low duty mode. The mobile station can also perform scan for the macro base station or another femto base station for the unavailable interval.

Figure 4:
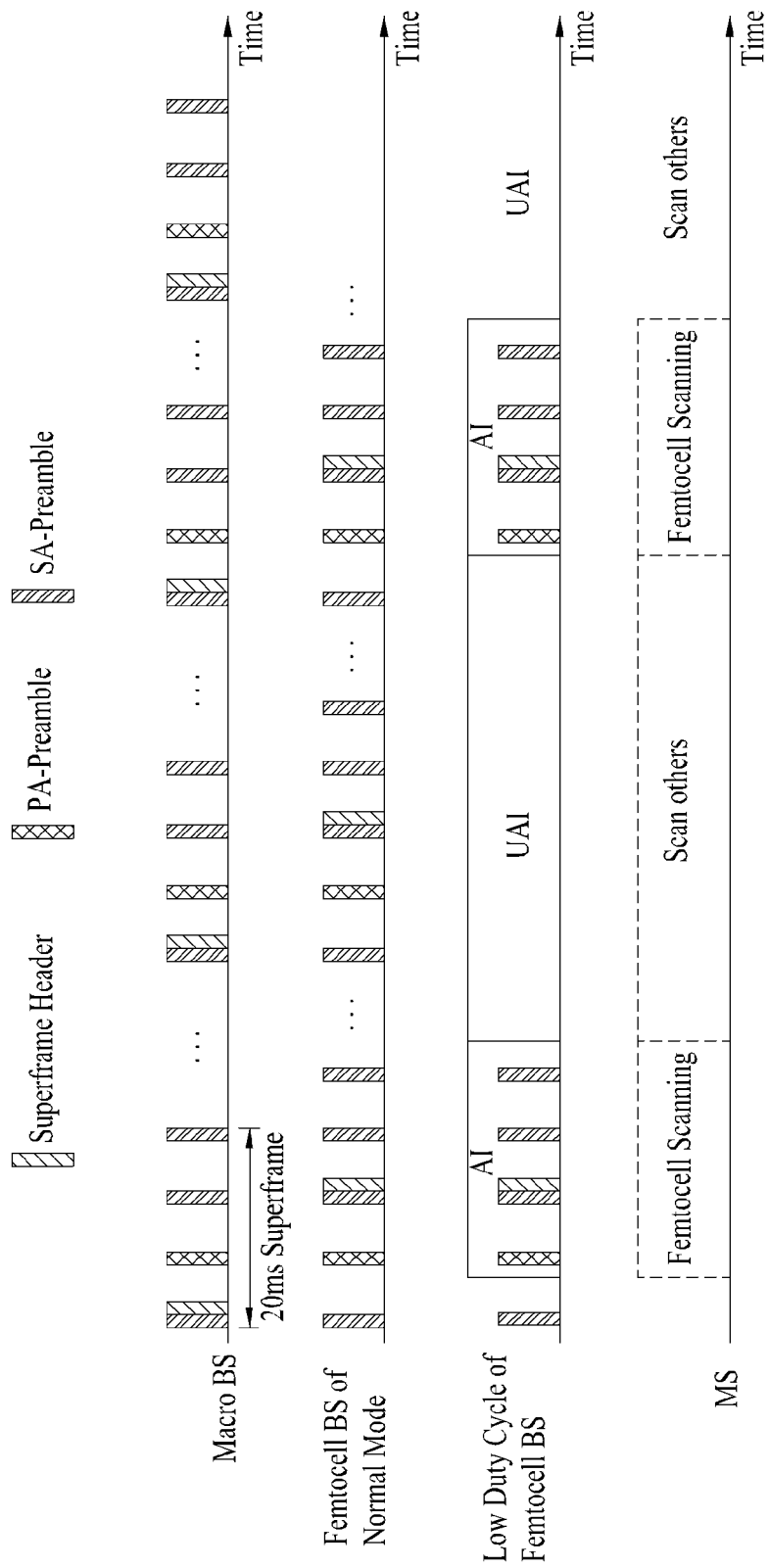
FIG. 4 is a diagram illustrating another example of a method for setting a default LDM pattern in accordance with one embodiment of the present invention.

FIG. 4 is a diagram illustrating another example of a method for setting a default LDM pattern in accordance with one embodiment of the present invention.

In FIG. 4, it is assumed that the available interval of the default LDM pattern includes four frames in the order of PA preamble→SA preamble→superframe header→SA preamble→SA preamble. Also, it is assumed that each preamble of the femto base station is transmitted to the same position as that transmitted from the macro base station and at the same time when each preamble is transmitted from the macro base station. However, it is assumed that the position to which the superframe header of the femto base station is transmitted is different from that of the macro base station.

Referring to FIG. 4, the mobile station can receive all of the PA preamble, the SA preamble and the superframe header within two frames from the start point of the available interval of the default LDM pattern of the corresponding femto base station to attempt scan for the femto base station operating at the low duty mode. The mobile station can also perform scan for the macro base station or another femto base station for the unavailable interval, as described above.

Figure 5:
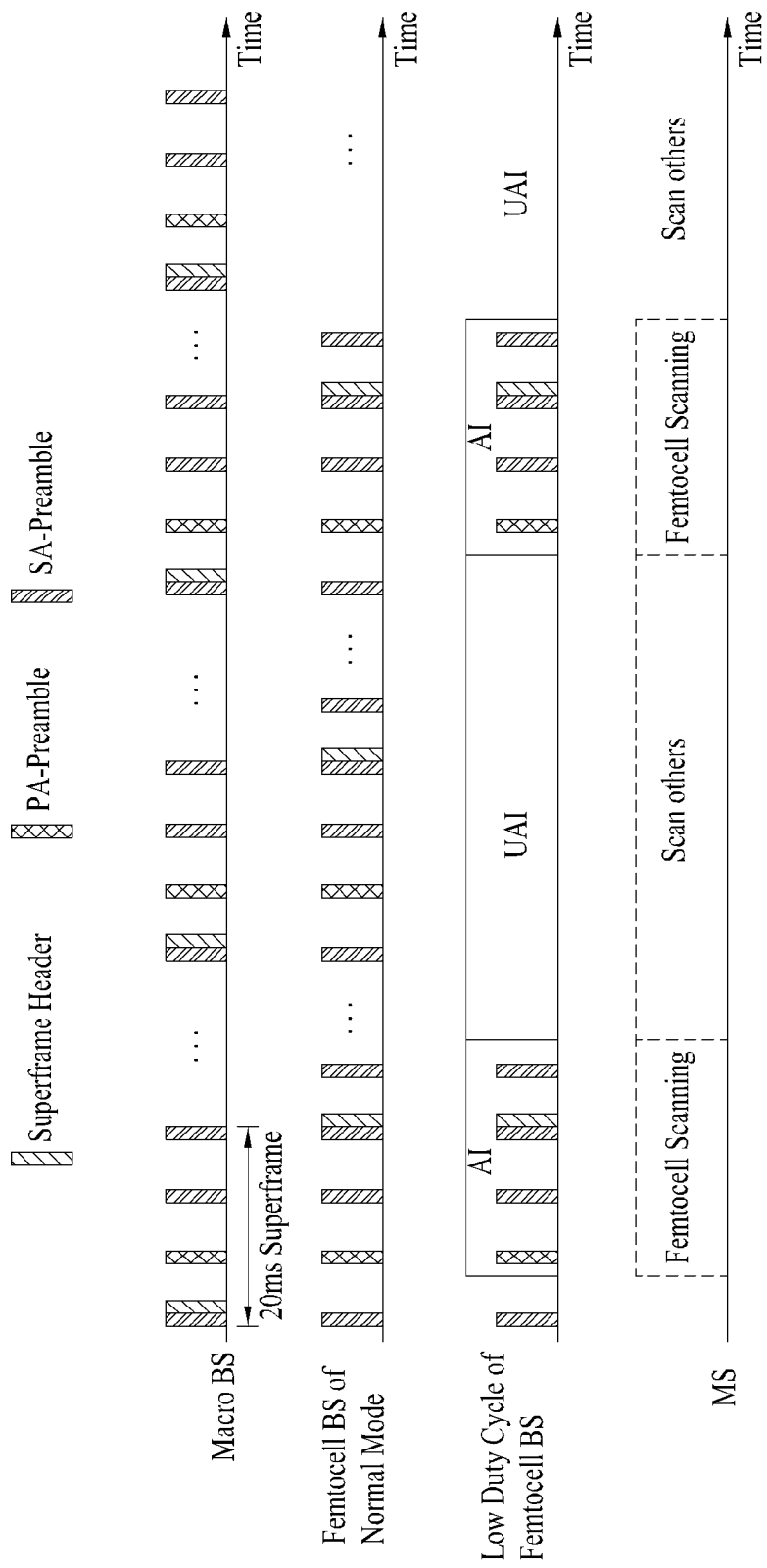
FIG. 5 is a diagram illustrating other example of a method for setting a default LDM pattern in accordance with one embodiment of the present invention.

FIG. 5 is a diagram illustrating other example of a method for setting a default LDM pattern in accordance with one embodiment of the present invention.

In FIG. 5, it is assumed that the available interval of the default LDM pattern includes four frames in the order of PA preamble→SA preamble→SA preamble→superframe header→SA preamble. Also, it is assumed that each preamble of the femto base station is transmitted on the same position of the frame structure as that transmitted from the macro base station and at the same time when each preamble is transmitted from the macro base station. However, it is assumed that the position on which the superframe header of the femto base station is transmitted is different from that of the macro base station.

Referring to FIG. 5, the mobile station can receive all of the PA preamble, the SA preamble and the superframe header within three frames from the start point of the available interval of the default LDM pattern of the corresponding femto base station to attempt scan for the femto base station operating at the low duty mode. The mobile station can also perform scan for the macro base station or another femto base station for the unavailable interval, as described above.

As another embodiment of the present invention, a mobile station (MS) and a femto base station (FBS) through which the embodiments of the present invention can be carried out will be described.

The mobile station is operated as a transmitter in an uplink, whereas the mobile station is operated as a receiver in a downlink. Also, the base station is operated as a receiver in the uplink, whereas the base station is operated as a transmitter in the downlink. In other words, each of the mobile station and the base station can include a transmitter and a receiver for transmission and reception of information or data.

The transmitter and the receiver can include a processor, a module, a part, and/or a means, for which the embodiments of the present invention are carried out. In particular, the transmitter and the receiver can include a module (means) for encoding messages, a module for decoding the encoded messages, and an antenna for transmitting and receiving messages. An example of the transmitter and the receiver will be described with reference to FIG. 6.

FIG. 6 is a block diagram illustrating an example of a transmitter and a receiver according to another embodiment of the present invention.

Referring to FIG. 6, the left side represents a structure of the transmitter while the right side represents a structure of the receiver. Each of the transmitter and the receiver can include an antenna 5, 10, a processor 20, 30, a Tx module 40, 50, an Rx module 60, 70, and a memory 80, 90. The respective elements can perform corresponding functions. Hereinafter, the respective elements will be described in more detail.

The antenna 5, 10 serves to transmit a signal generated by the Tx module 40, 50 to the outside or receive a radio signal from the outside to transfer the radio signal to the Rx module 60, 70. If a MIMO function is supported, two or more antennas may be provided.

The antenna, the Tx module, and the Rx module can constitute a radio frequency (RF) module.

The processor 20, 30 generally controls the whole operation of the mobile station. For example, the processor 20, 30 can perform a controller function for performing the aforementioned embodiments of the present invention, a medium access control (MAC) frame variable control function according to service characteristics and radio wave condition, a handover function, an authentication and encryption function, etc.

Particularly, the processor of the mobile station can scan the femto base station operated at the low duty mode according to a predetermined default low duty mode pattern by controlling the RF module. In more detail, the processor is pre-provisioned with the femto base station, acquired through a predetermined broadcast message, or can determine the available interval by using information of the default low duty mode pattern through a registration response (AAI_REG-RSP) message during entry to the femto base station. The available interval starts from a frame including a PA preamble in a unit of four frames, and the processor can perform scan for the femto base station by receiving the PA preamble, the SA preamble and the superframe header in due order.

Also, the processor of the base station can determine entry to the low duty mode if mobile stations attached thereto enter a sleep mode or an idle mode or if it is determined that there is no mobile station in the periphery. Then, the processor can repeat the available interval and the unavailable interval of a predetermined length in accordance with the default low duty mode pattern. Moreover, the processor of the base station can allocate required uplink resources to the mobile station by analyzing MAC message or data transmitted from the mobile station, generate uplink grant for reporting allocated details to the mobile station, and perform scheduling for transmitting the uplink grant.

The Tx module 40, 50 performs predetermined coding and modulation for data, which are scheduled from the processor 20, 30 and then transmitted to the outside, and then transfers the coded and modulated data to the antenna 10.

The Rx module 60, 70 performs decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (sleep mode information according to reference synchronization information). Also, the memory 80, 90 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Meanwhile, the base station performs a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function according to service characteristics and radio wave condition, a quick traffic real-time control function, a handover function, and an authentication and encryption function, a packet modulation and demodulation function for data transmission, a quick packet channel coding function and a real-time modem control function through at least one of the aforementioned modules, or further includes a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of a low duty mode (LDM) operation based on a superframe structure for a femto base station, the method comprising:
performing the LDM operation at an available interval and an unavailable interval according to a default LDM pattern,
wherein each of a first superframe and a second superframe corresponding to the superframe structure includes a first frame, a second frame, a third frame, and a forth frame sequentially, the first frame includes a secondary advanced (SA) preamble and a superframe header, the second frame includes a primary advanced (PA) preamble, the third frame includes the SA preamble, and the PA preamble is included in only the second frame, and
wherein the available interval according to the default LDM pattern begins with the second frame of the first superframe and encompasses contiguous portions of the first superframe and the second superframe such that the PA preamble, one or more of the SA preambles, and the superframe header are transmitted sequentially during the available interval.

2. The method of claim 1, wherein the femto base station enters the low duty mode if there are no mobile stations attached to the femto base station and there are no mobile stations in the process of network entry.

3. The method of claim 1, wherein the performing the LDM operation according to the default LDM pattern comprises:
activating an air interface for paging, transmitting system information, ranging or data traffic transmission during the available interval; and
synchronizing with an overlay macro base station during the unavailable interval,
wherein the air interface is not used for transmission during the unavailable interval.

4. The method of claim 1, wherein a duration of the available interval and a duration of the unavailable interval are respectively set in units of four frames.

5. The method of claim 1, wherein one unit of the available interval includes one PA preamble of the first superframe, the one or more the SA preambles of the first and second superframes, and one superframe header of the second superframe.

6. The method of claim 1, wherein the first preamble includes information of carrier configuration and system bandwidth, and the SA preamble includes information related to a cell ID and information related to a base station type.

7. The method of claim 1, wherein default LDM pattern information is pre-provisioned between the femto base station and a mobile station.

8. The method of claim 7, wherein the default LDM pattern information includes a duration of the available interval, a duration of the unavailable interval, and information related to a start superframe number indicating from where the LDM operation starts.

9. A method of scanning a femto base station operated at a low duty mode (LDM) based on a superframe structure through a mobile station, the method comprising:
receiving, by the mobile station, a primary advanced (PA) preamble during an available interval according to a default LDM pattern;
after receiving a first preamble, receiving, by the mobile station, at least one secondary advanced (SA) preamble during the available interval; and
after receiving a second preamble, receiving, by the mobile station, a start superframe header during the available interval,
wherein each of a first superframe and a second superframe corresponding to the superframe structure includes a first frame, a second frame, a third frame, and a forth frame sequentially, the first frame includes the SA preamble and the superframe header, the second frame includes the PA preamble, the third frame includes the SA preamble, and the PA preamble is included in only the second frame, and
wherein the available interval according to the default LDM pattern begins with the second frame of the first superframe and encompasses contiguous portions of the first superframe and the second superframe such that the PA preamble, the at least one SA preamble, and the superframe header are received in the mobile station sequentially during the available interval.

10. The method of claim 9, wherein a duration of the available interval is set in units of four frames.

11. The method of claim 9, wherein one unit of the available interval includes one PA preamble, the at least one second preamble, and one superframe header.

12. The method of claim 9, wherein the PA preamble includes information of carrier configuration and system bandwidth, and the SA preamble includes information related to a cell ID and information related to a base station type.

13. The method of claim 9, wherein default LDM pattern information is pre-provisioned between the femto base station and the mobile station.

14. A mobile station, comprising:
a processor configured to scan a femto base station operated at a low duty mode (LDM) based on a superframe structure; and
a radio frequency (RF) module configured to transmit and receive a radio signal to and from the outside under the control of the processor,
wherein the processor controls the RF module and scans the femto base station by receiving primary advanced (PA) preamble, at least one secondary advanced (SA) preamble, and a superframe header during an available interval according to a default low duty mode (LDM) pattern,
wherein each of a first superframe and a second superframe corresponding to the superframe structure includes a first frame, a second frame, a third frame, and a forth frame sequentially, the first frame includes the SA preamble and the superframe header, the second frame includes the PA preamble, the third frame includes the SA preamble, and the PA preamble is included in only the second frame, and
wherein the available interval according to the default LDM pattern begins with the second frame of the first superframe and encompasses contiguous portions of the first superframe and the second superframe such that the PA preamble, the at least one SA preamble, and the superframe header are received in the mobile station sequentially during the available interval.

15. The mobile station of claim 14, wherein a duration of the available interval is set in units of four frames.

16. The mobile station of claim 14, wherein one unit of the available interval includes one PA preamble, the at least one SA preamble, and one superframe header.

17. The mobile station of claim 14, wherein the PA preamble includes information of carrier configuration and system bandwidth, and the SA preamble includes information related to a cell ID and information related to a base station type.

18. The mobile station of claim 14, wherein default LDM pattern information is pre-provisioned between the femto base station and the mobile station.

19. The method of claim 1, further comprising:
transmitting default LDM pattern information to a mobile station through a registration response (AAI_REG-RSP) message.

20. The method of claim 9, further comprising:
receiving default LDM pattern information through a registration response (AAI_REG-RSP) message.

21. The mobile station of claim 14, wherein default LDM pattern information is received by the mobile station through a registration response (AAI_REG-RSP) message.

22. The method of claim 1, wherein the SA preamble is followed by the superframe header within the first frame.

* * * * *